(12) United States Patent
Barbison

(10) Patent No.: US 7,624,995 B2
(45) Date of Patent: Dec. 1, 2009

(54) SUSPENSION WITH INTEGRATED LEVELING AND STABILIZATION MECHANISMS

(75) Inventor: James M. Barbison, Brampton (CA)

(73) Assignee: Ride Control, LLC, Troy, MI (US)

( * ) Notice: Subject to any disclaimer, the term of this patent is extended or adjusted under 35 U.S.C. 154(b) by 1481 days.

(21) Appl. No.: 10/256,645

(22) Filed: Sep. 27, 2002

(65) Prior Publication Data

US 2004/0061293 A1    Apr. 1, 2004

(51) Int. Cl.
B60P 1/00     (2006.01)
B60S 9/00     (2006.01)

(52) U.S. Cl. .............. 280/6.153; 280/5.514; 280/5.515; 280/6.154; 280/6.155

(58) Field of Classification Search .............. 280/6.154, 280/5.512, 5.507, 124.157, 124.162, 5.509, 280/5.514, 5.515, 6.151, 6.153, 6.155
See application file for complete search history.

(56) References Cited

U.S. PATENT DOCUMENTS

| | | | |
|---|---|---|---|
| 3,836,161 A | 9/1974 | Buhl | |
| 3,917,307 A | 11/1975 | Shoebridge | |
| 4,084,830 A | 4/1978 | Daniel, Jr. et al. | |
| 4,335,901 A | 6/1982 | Gladish | |
| 4,462,610 A * | 7/1984 | Saito et al. ............... | 280/6.159 |
| 4,573,705 A * | 3/1986 | Kanai et al. .................. | 180/422 |
| 4,634,143 A * | 1/1987 | Asami et al. ............. | 280/5.503 |
| 4,641,843 A | 2/1987 | Morrisroe, Jr. | |
| 4,659,104 A * | 4/1987 | Tanaka et al. ............ | 280/6.158 |
| 4,730,843 A * | 3/1988 | Tanaka et al. ............ | 280/5.506 |
| 4,911,617 A * | 3/1990 | Buma et al. .................. | 417/439 |
| 5,042,833 A * | 8/1991 | Kawabata ............... | 280/5.501 |
| 5,069,302 A * | 12/1991 | Kageyama ................... | 180/197 |
| 5,135,065 A * | 8/1992 | Kawasaki et al. ............. | 180/41 |
| 5,193,849 A * | 3/1993 | Holzmann ............... | 280/6.152 |
| 5,452,919 A * | 9/1995 | Hoyle et al. ............. | 280/5.514 |
| 5,765,115 A * | 6/1998 | Ivan ............................. | 701/38 |
| 6,173,974 B1 * | 1/2001 | Raad et al. ............... | 280/6.157 |
| 6,305,673 B1 * | 10/2001 | Delorenzis et al. ........ | 267/64.13 |
| 6,598,885 B2 * | 7/2003 | Delorenzis et al. ........ | 280/5.507 |
| 6,679,509 B1 * | 1/2004 | Galazin et al. ........ | 280/124.116 |

* cited by examiner

*Primary Examiner*—Toan C To
(74) *Attorney, Agent, or Firm*—Rader, Fishman & Grauer, PLLC

(57) ABSTRACT

A stabilization system for a motor vehicle includes an independently actuatable airbag assembly disposed at each wheel. A damper assembly disposed at each wheel is lockable to maintain the motor vehicle in the desired level position. The system includes a controller in communication with the airbag and damper assembly and a sensor assembly that senses a relative position of the body of the motor vehicle relative to a level plane and adjusts the airbag assembly in order to attain a level position of the motor vehicle and once that level position is attained, lock the damper assembly in order to provide a foundation-like feel to the motor home in a parked position.

22 Claims, 2 Drawing Sheets

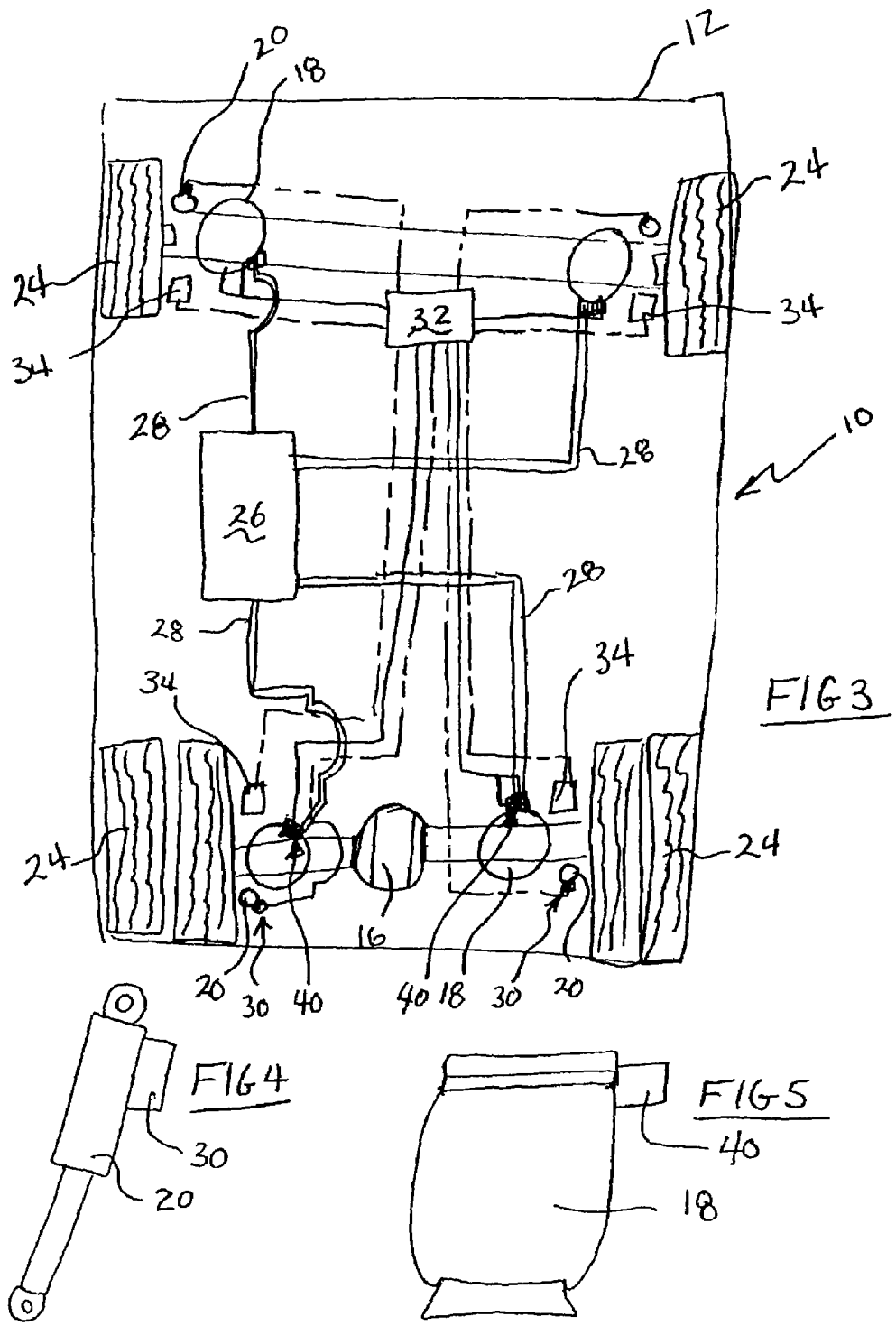

SUSPENSION WITH INTEGRATED LEVELING AND STABILIZATION MECHANISMS

BACKGROUND OF THE INVENTION

This invention relates generally to a leveling and stabilization system for a motor vehicle and specifically to a leveling and stabilization mechanism for a motor home or recreational vehicle.

Typically, a motor home or recreational vehicle is used off-road in rough areas or campgrounds that may not have a level surface. The non-level surface creates an uncomfortable feeling for occupants within the motor home especially if long durations of time are spent at a specific location. To correct for the uneven terrain that is often found at campsites, leveling aids such as jacks are often provided with the motor home.

Typically the motor home will include jacks or other manual leveling type devices disposed at each of the four corners of the motor home. The mechanical or manually operated leveling device can include any type known to those skilled in the art. Each jack is extended from a corner of the motor home until a satisfactorily level condition is obtained. Manually operated jacks are undesirable because of height limitations of the jacks that in some instances may not extend adequately to level the vehicle. Further, manually operated jacks are tedious and can be difficult to operate if not carefully maintained. Additionally, during inclement weather it maybe undesirable to leave the motor home in order to operate such manually operated jacks to level the vehicle.

Motor homes are typically equipped with a heavy-duty suspension to adequately provide for the desired ride considering the weight of the vehicle. Further, it is known in the art to use a pneumatic suspension system having pneumatically actuated dampers disposed at each wheel and controlled by a master control to raise and lower specific points of the motor home in order to properly level the motor home relative to the specific camping or parking space it is occupying. Such systems double as the vehicle suspension system during operation of the vehicle on the roadways. As appreciated, because the suspension system provides some give within the motor home, even though the motor home has been leveled, there can be a bouncy or spongy feeling experienced by occupants as they walk about the interior of the motor home. This bouncy or spongy feeling is due to the suspension of the motor home giving as is required during operation on roadways.

The same give and compliant nature of the suspension system desirable as the motor home is operated on a roadway provides undesirable sensations to an occupant when the motor home is parked in a campground or other position where the motor home is now operating as a temporary residence. As appreciated, occupants desire a steady and solid feel when parked and in use as a temporary residence.

Further, such suspension systems are complicated and require expensive and complex hydraulic mechanisms that add to the cost and complexity of an already expensive motor home. As appreciated, motor homes are often taken into rougher environments than are envisioned by vehicle designers. This combined with a complex hydraulic mechanism will often result in premature failure or reduce operational capacity of the hydraulic systems.

Accordingly, it is desirable to develop a leveling and stabilization system for a motor home or recreational vehicle that utilizes existing suspension components to level the motor vehicle and that can lock the motor vehicle in a level position to provide a stable condition when the motor home is used as a temporary residence.

SUMMARY OF THE INVENTION

The system of this invention is an integrated leveling and stabilization system that includes an independently actuated airbag assembly and lockable damper assemblies disposed at each corner of the motor vehicle to level and stabilize the motor vehicle.

The system of this invention includes an air suspension system having an independently actuatable airbag disposed at each wheel of the motor home. Each air spring is independently actuatable relative to other airbags disposed at the other corners of the motor home. In operation, the air bag is inflated or deflated in order to raise or lower a corner leveling the entire motor home and providing a comfortable stable position.

The system also includes a damper assembly disposed at each of the wheels of the motor home. The damper assembly of this system includes a valve that is actuatable to adjust the damper between an on position and a locked position. In the locked position, the damper assembly becomes a locked or fixed member such that the body of a motor home does not move relative to the suspension or frame members of the motor home. As appreciated, locking the damper assemblies of the motor home will stabilize the motor home and vehicle to eliminate any movement that may occur in the body of the motor home relative to the frame and suspension such that occupants within the motor home will experience a stable and foundation like feel.

The system includes a controller in electrical communication with at least one sensor for detecting the position of the motor home relative to a level plane. The controller is also in communication with the damper assemblies and air spring assemblies. The controller will actuate the air spring assemblies once the vehicle is in a parked position and the system is engaged to level the motor vehicle relative to a level plane. Once a satisfactorily level condition of the motor home is obtained, the controller locks the damper assembly.

Accordingly, the system of this invention provides for a greatly enhanced, simple and stable levelization and stabilization system for a motor home. Further, leveling and stabilization mechanism of this invention prevents and inhibits roll and rocking of the motor vehicle once a desired position is obtained.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is a schematic view of the entire system;

FIG. 4 is a plan view of an embodiment of a damper assembly; and

FIG. 5 is a plan view of an embodiment of an air spring assembly.

DETAILED DESCRIPTION OF THE PREFERRED EMBODIMENT

Figure 1:
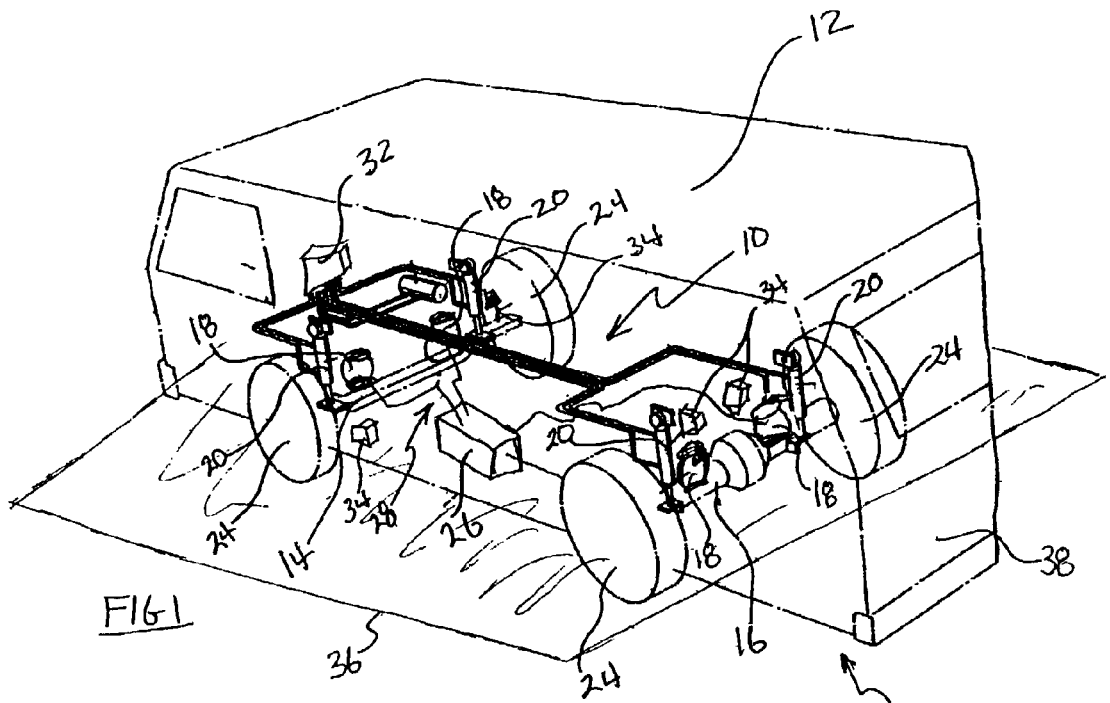
FIG. 1 is a schematic illustration of this system disposed within a motor home.

Referring to FIG. 1, wherein like numerals indicate like or corresponding parts throughout the several views, the invention is a suspension and leveling stabilization system generally indicated at 10. The system 10 is installed within a recreational vehicle or motor home 12. Although this system 10 is shown installed within a recreational vehicle or motor home 12, it is within the contemplation of this invention that the system 10 of this invention may be applied to other motor vehicles that would benefit from a leveling mechanism that can stabilize the motor vehicle once a desired position is obtained.

The system 10 of this invention includes an air spring assembly 18 disposed at each wheel 24 of the motor home 12. By providing an air spring assembly 18 at each wheel 24 of the motor home 12, a leveling device is disposed essentially at each of the corners of the motor home 12. The air spring assembly 18 is as is known to a worker skilled in the art. In such systems, the air spring assembly 18 is disposed at each wheel 24 of the motor home. The air spring assembly 18 is typically maintained at a desired pressure that provides for a desired ride characteristics of the motor home 12 as it is operating on the roadways.

In the system 10 of this invention, each of the air springs assemblies 18 are independently actuatable relative to air springs either on an opposite side of the motor home 12 or to the front or rear of the motor home 12. By providing independent actuation of each of the air spring assemblies 18, leveling of the motor home 12 is accomplished by adjusting pressure within the air spring assemblies 18 disposed at the four corners of the motor home 12.

The system 10 includes a controller 32 that is in communication with sensors 34 disposed about the motor home 12. The sensors 34 sense the position of the motor home 12 relative to a level plane 36. The controller 32 then operates a valve 40 disposed in each of the air spring assemblies 18 to independently actuate each of the air spring assemblies 18 to either pressurize or de-pressurize that air spring to level the motor home 12. The motor home 12 includes a rear axle 16 and a front axle 14. The air spring assemblies 18 are typically assembled to the axle assemblies 16, 14 to provide desired ride characteristics of the motor home 12 while being operated on a roadway.

Additionally, damper assemblies 20 are disposed at each wheel 24 of the motor home 12. The damper assembly 20 of this system 10 includes a valve assembly 30 actuatable between an on position and a locked position. In the locked position, the damper assembly 20 becomes a fixed member and allows no relative movement between a body 38 and frame 22 of the motor home 12. As appreciated, the damper assembly 20 maybe of any type as is known by a worker skilled in the art, and although a damper assembly having an on position and a locked position is preferred, it is within the contemplation of this invention that the damper assembly 20 may also provide variable dampening between the on position and locked position.

Figure 2:
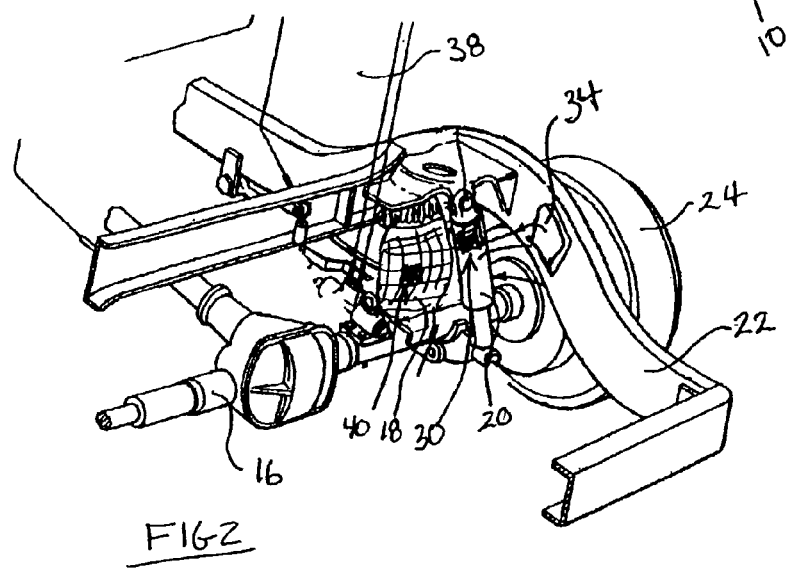
FIG. 2 is a schematic illustration of one corner of the motor home.

Referring to FIG. 2, a portion of the system 10 is shown including the air spring assembly 18 and damper assembly 20. The air spring assembly 18 and damper assembly 20 are assembled to the rear axle 16 that suspends the wheel 24. As appreciated, in operation of the motor home 12 along a roadway, the air spring assembly 18 provides for a specific ride characteristic of the motor home 12 while the damper assembly 20 prevents oscillation of the body 38 of the motor home 12 relative to the frame 22. Sensor 34 disposed in a position relative and associated with the air spring assembly 18 and damper assembly 20 provides relative position of the motor home 12 relative to the level plane 36, as shown in FIG. 1.

Referring to FIG. 3, the system 10 is schematically shown disposed within a motor home 12. The system 10 includes an air supply 26 that supplies air to each of the air spring assemblies 18 by way of air supply lines 28. The air supply 26 provides sufficient air pressure to the air spring assemblies 18 in order to provide both the desired ride characteristics of the motor home 12 and to raise and lower each corner of the motor home 12 in order to reach a desired position. A valve assembly 40 is shown disposed within the air spring assembly 18. Although in this embodiment, the valve assembly 40 is disposed within the air spring assembly 18, it is also within the contemplation of this invention that the valve assembly 40 for controlling pressure within an independent air spring assembly 18 may be disposed anywhere within the system 10 such as at the air supply 26 as is known to a worker skilled in the art in order to direct and control air pressure within each air spring assembly 18.

The valve assembly 40 is in communication with the controller 32. The controller 32 is also in communication with sensors 34 disposed about the motor home 12. In this embodiment, the sensor 34 is shown at each corner of the motor home 12. It should be understood that it is within the contemplation of this invention that additional sensors 34 or less sensors may be utilized for providing position information of the motor home 12 relative to a desired level plane 36 (See FIG. 1).

Accompanying each air spring assembly 18 is the damper assembly 20. The damper assembly 20 includes the valve assembly 30. The valve assembly 30 is actuatable between an actuated position allowing for movement of the damper assembly 20 and a locked position which locks the damper assembly 20. The valve assembly 30 is in communication with the controller 32. The damper assembly 20 may be of any type known to a worker skilled in the art and it is within the contemplation of this invention that the damper assembly 20 may also include variable dampening means as are known to a worker skilled in this art.

In operation while traveling along a roadway, the air spring assemblies 18 and damper assemblies 20 operate as is typically understood. The air spring assemblies 18 provide a favorable and compliant suspension during operation of the motor home 12 along the roadway. Once the motor home 12 is parked, the controller 32 recognizes that the motor home 12 is in a parked position and senses a position of the motor home 12 relative to the level plane 36 (FIG. 1). The controller 32 may be manually or automatically actuated such that an operator may manually actuate the system 10 to level the motor home 12 or set to automatically level and stabilize the motor home 12 once the motor home 12 is parked. In either mode of operation the controller 32 will trigger the valve assemblies 40 at each of the independently actuatable air spring assemblies 18 to either raise or lower the specific portion of the motor home 12 to reach the level plane 36. Sensors 34 disposed about the motor home 12 will read the specific position of a portion of the motor home 12 relative to the level plane 36 which in turn is transferred by the controller 32 into commands for pressurizing or de-pressurizing individual air spring assemblies 18.

Once the motor home 12 has obtained a level position by pressurizing or de-pressurizing individual air spring assemblies 18, the motor home body 38 will provide a compliant or bouncy feel to occupants moving within the passenger compartment of the motor home 12. This is so because the air spring assemblies 18 are compliant in order to provide the desired ride when the motor borne 12 is moving along the roadway. The damper assemblies 20 are actuated to lock the body 38 of the motor home 12 to prevent relative movement between the body 38 and frame 22 of the motor home 12.

Preferably, the damper assembly 20 operates by allowing fluid flow through a specifically sized orifice. The specifically sized orifice provides the dampening characteristics that eliminate oscillation of the motor home 12 caused by inconsistencies of the roadway. Once this orifice is blocked and fluid is not able to flow from one chamber to another, the damper assembly 20 becomes essentially a fixed member that prevents movement of the body 38 relative to the frame 22 to provide a foundation like feel to the motor home 12.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A stabilization system for use on a motor vehicle having a plurality of corners and including a wheel assembly to be disposed at each corner of the motor vehicle, said stabilization system comprising;
   an air spring assembly disposed at each of the wheel assemblies and independently actuatable for adjusting a corner of the motor vehicle to a desired orientation;
   a damper assembly disposed at each of the wheel assemblies and lockable for maintaining the motor vehicle in the desired orientation;
   a controller in communication with each of said air spring assemblies and said damper assemblies for actuating said air spring assemblies and said damper assemblies to hold the motor vehicle in the desired orientation.

2. The system of claim 1, further including a sensor assembly for determining an orientation of the motor vehicle relative to a level plane.

3. The system of claim 2, further including said sensor assembly including a sensor assembly to be associated with each of the corners of the motor vehicle.

4. The system of claim 1, wherein said controller is actuatable to adjust said air spring assemblies to move the motor vehicle to the desired orientation.

5. The system of claim 1, wherein said damper assembly includes a valve assembly actuatable between a locked and unlocked position.

6. The system of claim 1, including an air supply and a valve associated with each of said air spring assemblies for controlling air pressure within each of said air spring assemblies.

7. The system of claim 1, wherein said controller locks said damper assembly only when the motor vehicle is parked.

8. The system of claim 1, wherein said controller automatically senses an orientation of the motor vehicle and actuates one or more of said air spring assemblies to level the motor vehicle based upon the sensed orientation.

9. The system of claim 8, wherein said controller moves said damper assemblies to a locked position once the motor vehicle reaches the desired orientation.

10. The system of claim 1, wherein each of said damper assemblies is adjustable between a locked position where movement of said damper assemblies is disabled and an unlocked position where movement of said damper assemblies is enabled.

11. A motor vehicle having a plurality of corners and including wheel assemblies disposed at each of the corners, said motor vehicle comprising:
    a suspension assembly including an air spring assembly for each of the wheel assemblies, said air spring assemblies being actuatable for adjusting an orientation of said motor vehicle; and
    a damper assembly for each of the wheel assemblies for locking said motor vehicle at a desired orientation.

12. The motor vehicle as recited in claim 11, wherein said damper assemblies comprise a locked position in which said damper assemblies are rigid members.

13. The motor vehicle as recited in claim 11, wherein said motor vehicle is a motor home.

14. The motor vehicle as recited in claim 11, comprising a sensor providing information indicative of said orientation to a controller.

15. The motor vehicle as recited in claim 14, wherein said controller actuates said air spring assemblies for adjusting said orientation to approach said desired orientation.

16. A control system for a motor vehicle having a plurality of corners and including a wheel assembly comprising an air spring assembly disposed at each corner of the motor vehicle, said control system comprising:
    a controller in communication with each of the air spring assemblies, said controller operable in a parked condition of the motor vehicle for receiving information indicative of a current orientation of the motor vehicle and sending a signal for adjusting a plurality of said air spring assemblies to move the motor vehicle from the current orientation to a desired orientation, wherein once in said desired orientation said controller adjusts a plurality of damping members to maintain said desired orientation.

17. The system as recited in claim 16, wherein said controller sends said signals for adjusting the plurality of air spring assemblies responsive to actuation by an operator.

18. The system as recited in claim 16, wherein said controller sends said signal for adjustment of said air spring assemblies responsive to detecting that the motor vehicle is in a parked condition.

19. The system as recited in claim 16, including a sensor assembly for determining an orientation of the motor vehicle associated with each of the corners of the motor vehicle.

20. The system as recited in claim 19, wherein said controller receives information indicative of vehicle orientation from each of said sensor assemblies.

21. The system as recited in claim 16, wherein said desired orientation comprises a level plane.

22. The system as recited in claim 16, wherein said plurality of damping members are lockable for maintaining the motor vehicle in said desired orientation.

* * * * *